Figure 1:
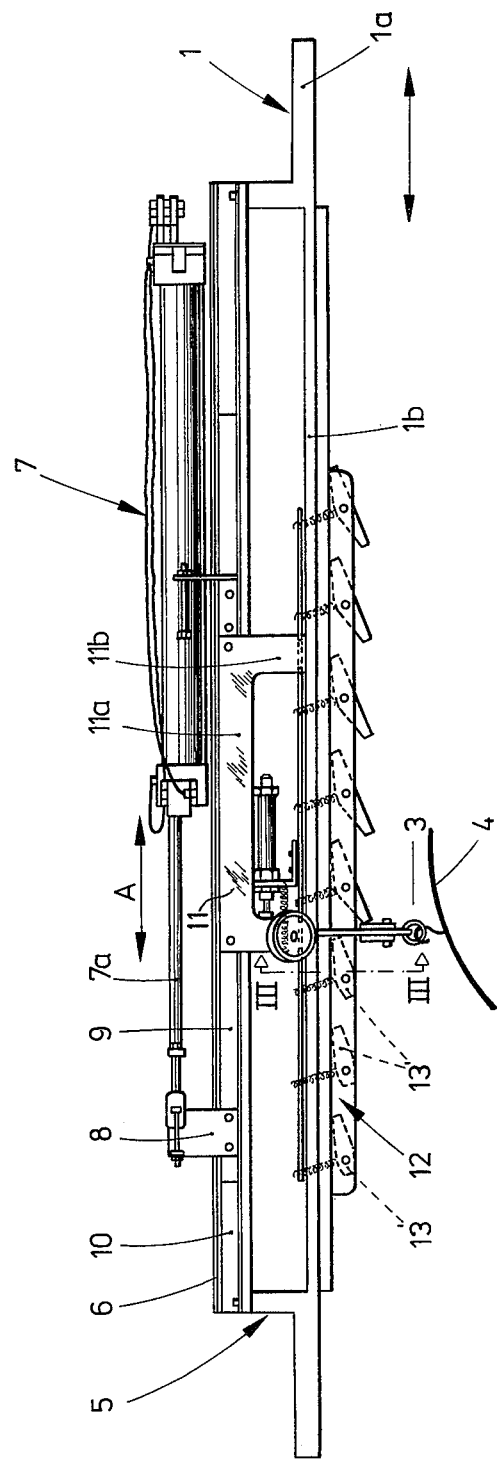

United States Patent [19]

Veith

[11] 4,344,363

[45] Aug. 17, 1982

[54] CONVEYOR APPARATUS, PARTICULARLY FOR OVERHEAD CONVEYANCE

[75] Inventor: Gustav G. Veith, Munich, Fed. Rep. of Germany

[73] Assignees: Gustav Georg Veith GmbH & Co., KG,; Veith Transpo GmbH, both of Munich, Fed. Rep. of Germany

[21] Appl. No.: 140,318

[22] Filed: Apr. 14, 1980

[30] Foreign Application Priority Data

Apr. 12, 1979 [DE] Fed. Rep. of Germany ....... 2915095

[51] Int. Cl.³ ............................................ B61B 13/12
[52] U.S. Cl. ..................................... 104/162; 104/95; 198/473; 198/718; 198/743
[58] Field of Search ....................... 104/88, 89, 95, 96, 104/162, 165; 198/473, 743, 718; 254/35

[56] References Cited

U.S. PATENT DOCUMENTS

| | | | |
|---|---|---|---|
| 3,197,023 | 7/1965 | Achammer | 104/162 X |
| 3,214,036 | 10/1965 | Lich | 104/162 X |
| 3,837,288 | 9/1974 | Cook | 104/162 |
| 4,111,485 | 9/1978 | Martin et al. | 104/162 X |
| 4,236,456 | 12/1980 | Schreyer et al. | 104/95 X |

FOREIGN PATENT DOCUMENTS

| | | | |
|---|---|---|---|
| 1405012 | 10/1968 | Fed. Rep. of Germany | 104/162 |
| 220912 | 7/1968 | U.S.S.R. | 254/35 |
| 230719 | 3/1969 | U.S.S.R. | 104/162 |
| 339744 | 5/1972 | U.S.S.R. | 104/162 |

*Primary Examiner*—Randolph A. Reese
*Attorney, Agent, or Firm*—James E. Nilles

[57] ABSTRACT

A conveyor apparatus particularly for intra-plant conveyance in the garment industry comprises conveyor tracks, carrier units travelling on the conveyor tracks and having each at least one stirrup member straddling a conveyor track from below and provided with rollers resting on the top surface of the track, and at least one drive unit for actively conveying the carrier units. The drive unit comprises a conveying bar actuatable to reciprocate along a track section and carrying a plurality of drive transmitting members for engagement with the carrier units. The drive transmitting members are mounted so that they are operative to convey in one working stroke direction, while being able to pass said carrier units without engagement therewith in the return stroke direction. The drive transmitting members are adjustable to reverse the conveying direction of the working stroke. Each drive transmitting member, in the form of a pawl, is pivotally attached to the conveying bar, and its pivotal movement in one direction is limited by engagement with a stop, while pivotal movement in the opposite direction is permitted against a resilient biasing force.

6 Claims, 7 Drawing Figures

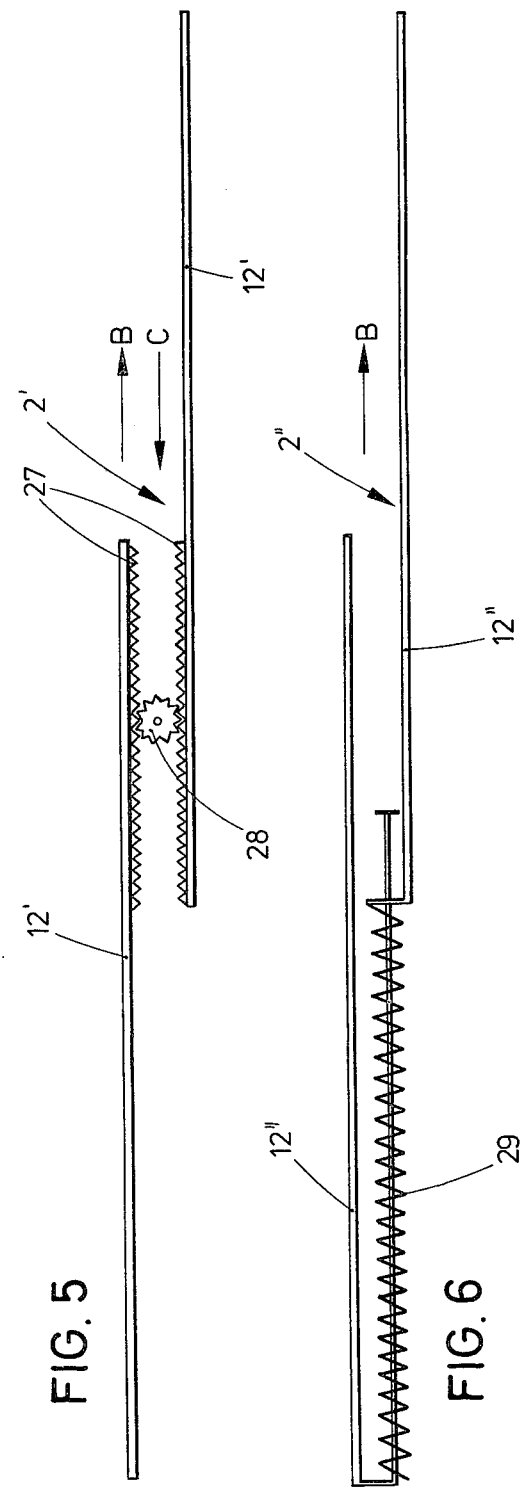

CONVEYOR APPARATUS, PARTICULARLY FOR OVERHEAD CONVEYANCE

This invention relates generally to conveyor apparatus. DE-PS 2,344,533 shows a conveyor apparatus of a type comprising a conveyor track system extending through all of the departments in a plant, from the storage area to the shipping station. The major portion of the conveying path serves the group-wise conveyance from one work station to another. Due to the effortless operation of the conveying system, this type of conveyance is readily accomplished manually, so that it can readily be adapted to any given requirements. At many work stations it is not necessary to remove the individual workpieces, for instance half-finished garments, from the transport hangers. For this reason already, the conveyor tracks adjacent such stations are preferably located at a reduced height within easy reach of operators. For better utilization of the available space, however, the tracks may be mounted at higher elevations in intermediate and final storage areas. In the known conveyor apparatus the carrier units are actively moved up and down inclined track sections by means of chain conveyors. Further conveyance or distribution in a larger high-level section requires either the provision of raised catwalks or platforms for an operator, or the employ of an implement having a sufficiently long handle for propelling the carrier units. Raised catwalks and platforms are rather expensive and cannot be installed in all places. On the other hand, manipulation of a long-handled implement is cumbersome and not without dangers. The installation of additional chain conveyors for substantially horizontal track sections is overly expensive as regards their construction as well as space requirements.

It is an object of the present invention to provide a conveyor apparatus of the type set forth in the introduction, which permits an active conveying operation to be carried out in areas of difficult access by simple means and in an economical manner.

An oscillating propelling bar together with its actuator can be readily constructed in a compact and space-saving configuration, and may thus be installed practically everywhere. A substantial advantage is due to the fact that a relative movement is possible between the driver elements and the carrier units, such relative movement being directed in the conveying direction with respect to the carrier units, and in the opposite direction with respect to the driver elements. It is thus possible for carrier units arriving with a certain momentum to pass the driver elements in the direction of travel. If the momentum of the arriving carrier units is sufficient to carry them to the intended position beyond the drive unit, the latter does not have to be actuated. If, however, a carrier unit or a group of carrier units comes to a halt at a conveyor track section occupied by the drive unit, actuation thereof will sooner or later cause the respective carrier unit to be engaged by an adjacent driver element and to be advanced thereby. A positive coupling between the driver element and the carrier unit is not required to this effect. This avoids the necessity of mechanisms for establishing and releasing such positive coupling as employed in the conventional chain conveyor.

The drive unit may be readily adapted for selectively conveying in any one of two directions by providing reversible driver elements for reversing the conveying direction, i.e. the operative stroke of the drive unit. A change of the conveying direction thus requires only a reversal of the engagement and release positions of the driver elements, without reversing the direction of movement of the conveying bar or its actuator.

Each driver element may be pivoted to the conveying bar in a simple manner, so that its pivotal movement in one direction is limited by a stop, while its pivotal movement in the opposite direction occurs against the bias of a spring. This pivotal movement of the driver elements occurs during the return stroke opposite to the conveying direction or in the case of a carrier unit passing the driver element in the conveying direction due to its momentum. For reversing the conveying direction, the driver element is to be adjusted to a position in which its freedom of movement is reversed. In a preferred embodiment, each driver element is formed as a two-armed pawl mounted for pivotal movement at its center. In this case, any one of the two arms can rest against a stop, while the other arm is in a position enabling it to engage a carrier unit. For reversing the conveying direction, the pawl can be adjusted to a position, in which the function of its two arms are reversed.

In a simple and advantageous embodiment, the reversible mounting of the pawl comprises a coiled spring extending perpendicularly to the longitudinal direction of the pawl and to the axis of its pivotal mounting and having its free end retained in support means spaced from the pivotal mounting and adapted for movement parallel to the conveying direction either together therewith or relative thereto for reversing the conveying direction. The support means thus permits to adjust the free end of the coiled spring to an offset position to one or the other side of the pivotal mounting. In this manner the coiled spring urges the driver pawl towards an inclined position, in which one of its arms projects into the path of the carrier units, while the other rests against a stop. If the free end of the coiled spring is offset towards the other side by relative movement of the support means, the position of the pawl is reversed, so that the one arm thereof rests against the stop, while the other projects into the path of the carrier units. In both positions the spring permits a pivotal movement of the pawl under the effect of a relative movement between the pawl and a carrier unit, causing the inoperative arm to be lifted off the stop against which it rests.

In a preferred embodiment the support means is formed as a rail having an opening for each spring, the end portion of each spring extending through the associated opening. A fixed connection between the support means and the spring is not required. The production and assembly of the support means is therefore particularly simple and economical.

The conveying bar may advantageously be formed as a U-section rail, with the pivot bearings of the pawls being disposed between the legs of the U-section, and the base thereof being formed with a through-opening for the respective coiled spring above each bearing. A conveying bar of this kind is a structurally particularly simple component. The mounting of the pawls is greatly facilitated. In each position of the pawl, only the arm thereof intended to engage the carrier units projects from the U-section rail. This permits the effective conveying direction to be readily and reliably ascertained even at considerable distance from the drive unit, as in the case of a drive unit installed along a high-level track section.

The employ of a U-section rail as the conveying bar offers the additional advantage that its base forms the stop limiting the pivotal movement of the pawl, resulting in a further simplified construction.

The support means may be spring-biased towards one of its end positions, while a cylinder-piston unit may be provided for moving it to its other end position and for retaining it therein. This offers the advantage that the drive unit in its spring-biased end position, which may be considered its normal position, keeps the conveyor track free for passage in one direction while obstructing passage in the opposite direction. In the vicinity of intermediate and end storage sections for instance, the spring-biased normal position of the support means may be selected such that carrier units can always freely enter the respective section with or without the aid of the drive unit, while carrier units cannot leave the respective section without previous reversal of the drive unit, even if actuation of the drive unit is not required. At the end of the conveying operation the support means automatically returns to its normal position, so that the exit is again obstructed. Errors on the operator's part are thus avoided.

In a drive unit disposed along a dead-end or cul-de-sac track section, the end portion of the conveying bar closer to the track end may be provided with one or more one-armed pawls with the single arm disposed at the side of the pivot bearing away from the track end. This is because these pawls serve only for conveying in one direction, namely, outwardly of the dead-end section. Carrier units entering this track section may be moved therealong up to a point, at which the leading unit arrives at a one-armed pawl. Even if the conveying bar were then to continue its reciprocating movement, the group of carrier units would no longer be conveyed. This offers the advantage that a group of carrier units comes to a halt within the operative range of the drive unit even without the employ of a braking device, with at least one carrier unit in a position for engagement by the conveying bar. For conveying the carrier units out of the respective track section, reversal of the support means causes the one-armed as well as the two-armed pawls to engage adjacent carrier units, so that the conveying thereof begins immediately.

For conveying a large and/or heavy group of carrier units in a substantially continuous manner, the conveyor apparatus according to the invention may advantageously be provided with two conveying bars mounted in side-by-side relationship along a track section for simultaneous reciprocating movement in opposite directions so as to alternately engage the carrier units. While one of the two conveying bars performs its working stroke, the other one performs its return stroke, and vice versa. In this manner, stoppage of the conveyance of the carrier units between consecutive working strokes is avoided and reacceleration of the carrier units is unnecessary. This is of particular advantage if the groups of carrier units to be conveyed are not easily movable due to great numbers and/or heavy weight of the loads suspended therefrom.

The movements of the two conveying bars are accomplished in a simple manner by means of an actuator acting on one of the two bars and a transmission interconnecting them. In a particularly simple embodiment, the transmission may comprise a toothed rack at each conveying bar and a gear engaging both racks.

For track section at which a pile-up of carrier units is likely to occur, for instance at narrow bends and the like, the conveying apparatus may be provided with a buffer zone comprising two partially overlapping conveying bars and a compression spring associated with the downstream conveying bar and adapted to be tensioned opposite to the conveying direction. A pile-up of carrier units adjacent the downstream conveying bar causes the compression spring to be increasingly compressed during each working stroke. Finally the oscillating compression of the spring will become sufficiently strong to act on the carrier unit with a force required for overcoming the piled-up condition. At the same time, the contraction of the compression spring may be employed for generating a warning signal in the case of unsurmountable obstructions along the further conveying path and/or for deenergizing the drive unit.

Figure 2:
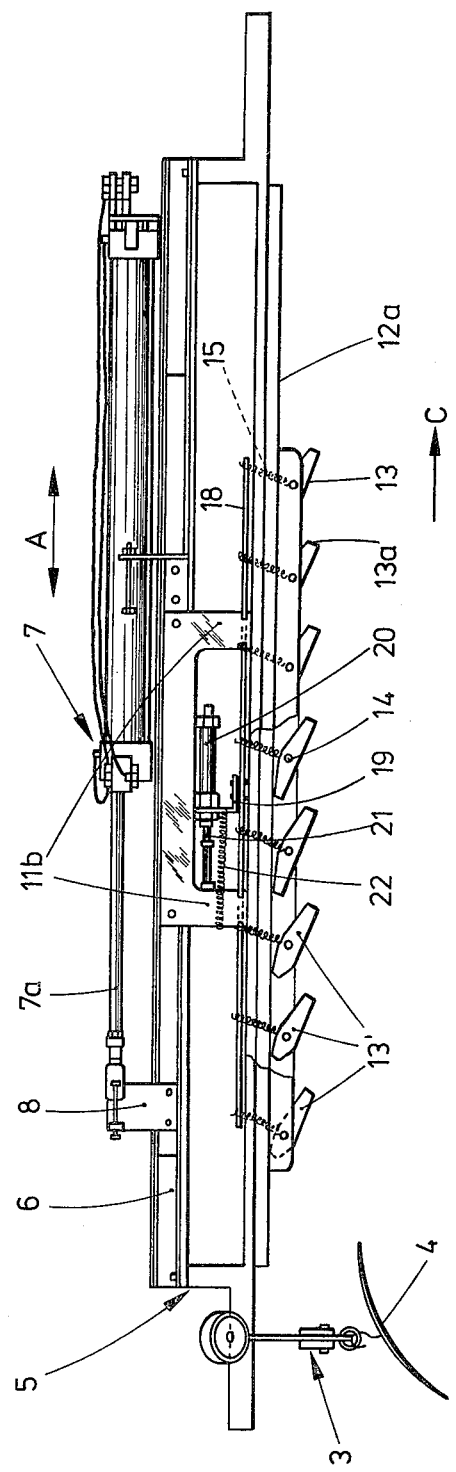
Figure 3:
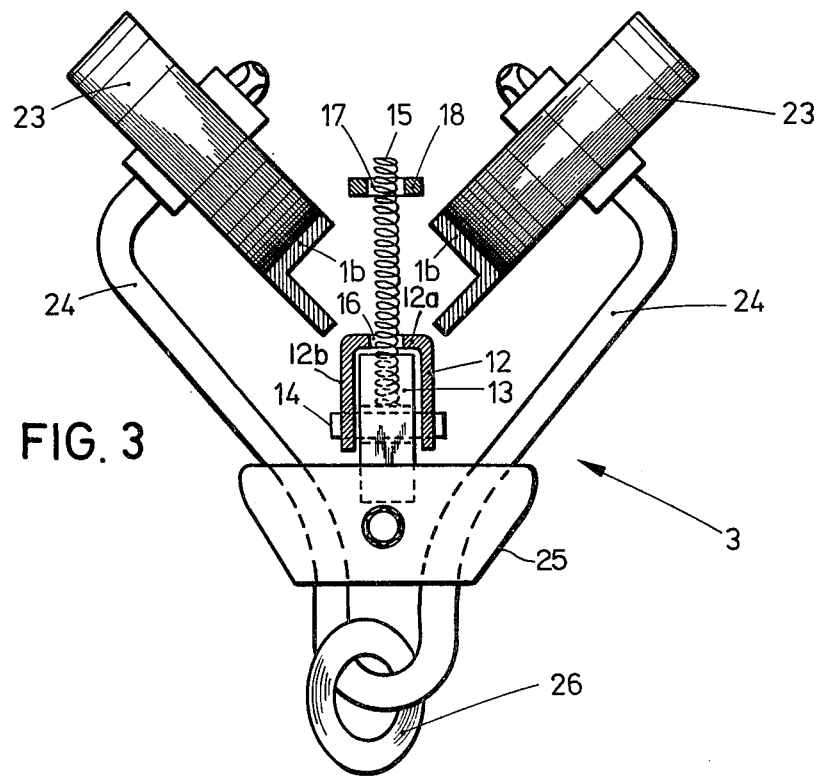
Figure 4:
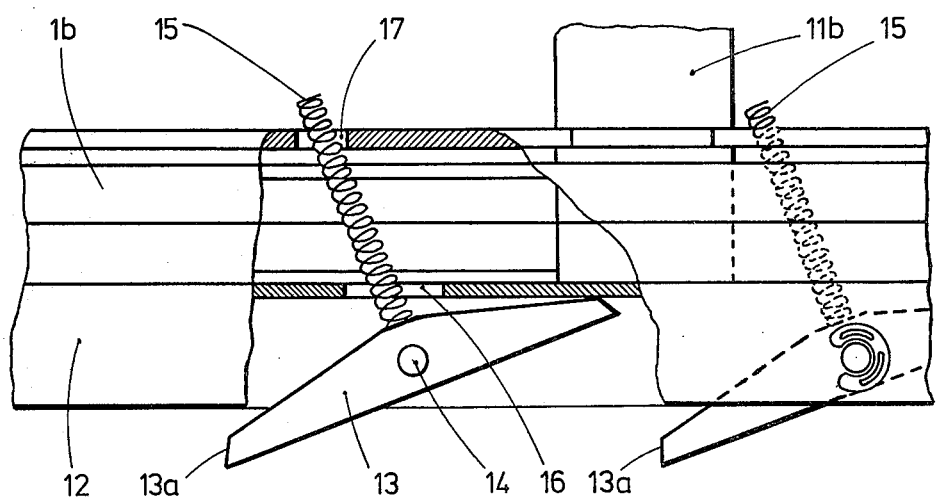
Figure 7:
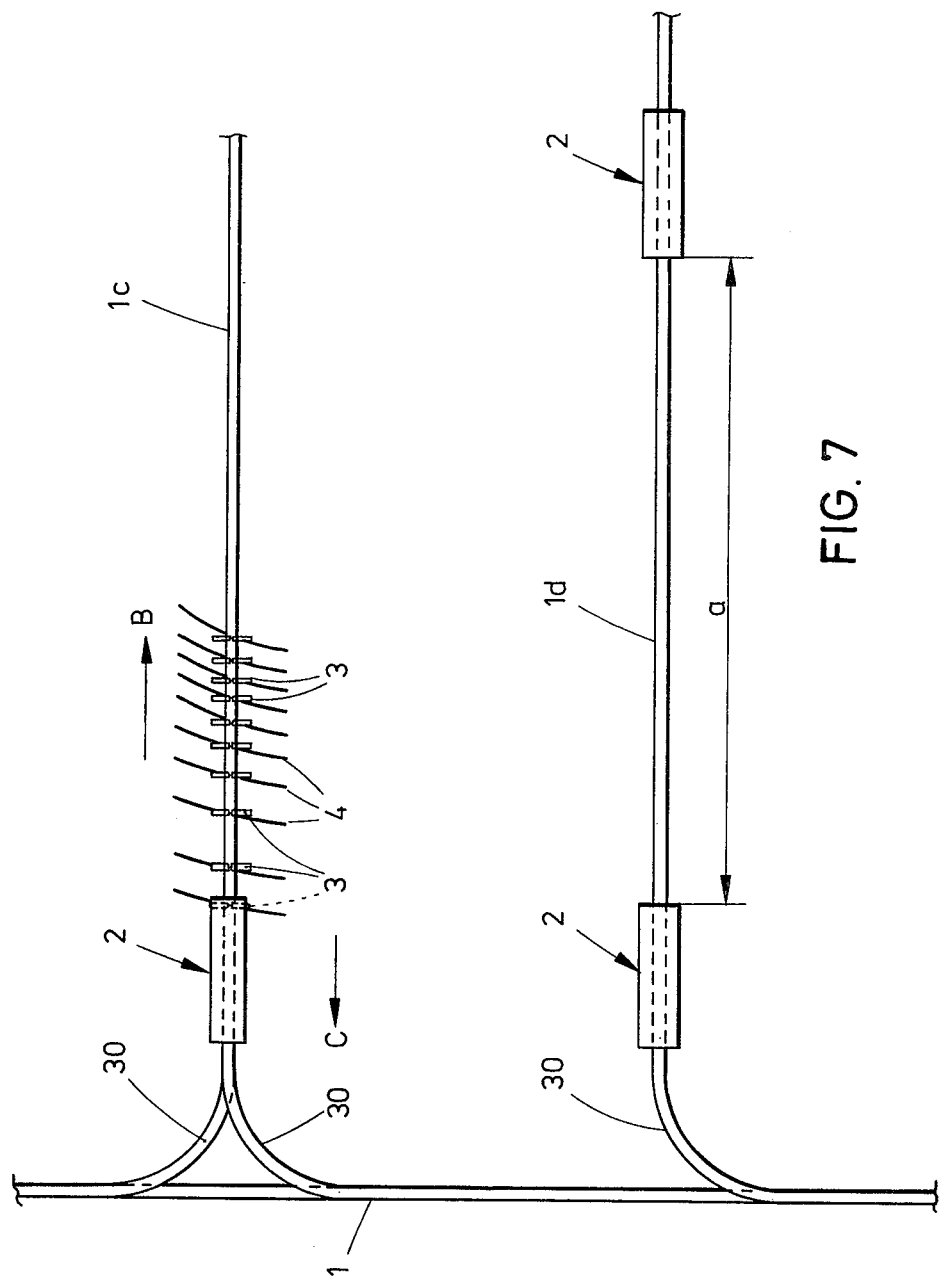

Embodiments of the invention shall now be described in greater detail with reference to the accompanying drawings, in which:

FIG. 1 shows a side view of a track section of the conveying apparatus according to the invention, including a drive unit, FIG. 2 shows a side view of the track section of FIG. 1, with the drive unit in a different position, FIG. 3 shows an enlarged sectional view of the drive unit in the direction of arrows III in FIG. 1, FIG. 4 shows an enlarged side view of a detail of the drive unit shown in FIG. 1, FIG. 5 shows a diagrammatic top plan view of a drive unit in a modified embodiment, FIG. 6 shows a diagrammatic top plan view of a drive unit in a further embodiment of the invention, and FIG. 7 shows a diagrammatic top plan view of a portion of the conveyor apparatus according to the invention, including a number of drive units.

Shown in FIGS. 1 and 2 is a track section of a conveyor apparatus for intraplant overhead conveying. The track section shown comprises a pair of rail tracks 1 and further includes a drive unit generally designated at 2. Drive unit 2 has a track portion 1a extending over its full length and connected to rail tracks 1 at both ends of the drive unit in a manner not shown. The rail tracks 1 of the conveying apparatus are generally in the shape of an angle section with its apex directed upwards. Over a substantial portion of its length between its ends, track portion 1a of drive unit 2 consists of two separate L-section rails disposed with their open sides facing towards one another (FIG. 3). The conveying apparatus further includes carrier units 3 in the form of trolleys running on rail tracks 1 and having means for suspending therefrom the articles to be conveyed. In the drawings, these means are indicated by coat hangers which in operation of the apparatus carry garments suspended therefrom.

Fixedly attached to track portion 1a of drive unit 2 is a frame 5 comprising a girder 6 extending parallel to track portion 1a. A cylinder-piston unit 7 is mounted on girder 6 with its stroke extending parallel thereto. The free end of piston 7a is connected to a bracket 8 fixedly attached to an elongate sliding shoe 9, the sliding path 10 of which is formed by a side surface of girder 6. Sliding shoe 9 is adapted to be moved back and forth in the direction of double arrow A by means of cylinder-piston unit 7, and is fixedly connected to a second frame 11. Frame 11 is substantially U-shaped, with an elongate base 11a connected to sliding shoe 9 and two depending legs 11b projecting downwards through the gap between L-section rail portions 1b and carrying a conveying bar 12 therebelow. Conveying bar 12 extends parallel to rail portions 1b and is of U-shaped cross section, its horizontal base 12a being connected to legs 11b of second frame 11. Conveying bar 12 is thus adapted to be moved back and forth in the direction of the double arrow A by means of cylinder-piston unit 7 via bracket 8, sliding shoe 9 and second frame 11.

The depending legs 12b of conveying bar 12 carry a number of two-armed pawls 13 mounted in longitudinally spaced relationship in pivot bearings 14. Each pawl 13 is of substantially symmetrical trapezoidal shape. At both ends of the longest side, the corners have been cut off to form an abutment edge 13a at each end of pawls 13. Fixedly attached to the center of the shortest side of each pawl 13, extending parallel to the longest side thereof, is a coiled spring 15 extending perpendicularly thereto. Each coiled spring 15 projects through a respective opening 16 in the base 12a of conveying bar 12. Openings 16 are formed vertically above pivot bearings 14. Coiled spring 15 further extends through the gap between rail portions 1b and projects freely through an opening 17 in a support member 18.

Support member 18 consists of a flat rail extending above rail portions 1b and parallel thereto. It is fixedly connected to one leg of an angle section 19, the other leg of which is fixedly connected to a cylinder 20. The piston 21 of cylinder 20 is connected to one leg 11b of second frame 11. The stroke of the cylinder-piston unit 20, 21 is parallel to support member 18 and thus to conveying bar 12. A tension spring 22 has one of its ends connected to the leg of angle section 19 connected to cylinder 20, and the other, to leg 11b of second frame 11 also engaged by piston 21. By being connected to angle section 19, tension spring 22 holds support member 18 in a normal position shown in FIG. 1, in which its openings 17 are offset to one side, in FIG. 1 to the left, relative to pivot bearings 14. This results in the coiled springs 15 being retained in a leftwards inclined position, whereby the associated pawls 13 are kept in a position in which their lefthand arms extend obliquely downwards, so that they project from between the legs of conveying bar 12, while the righthand arms of pawls 13 rest against the inside of horizontal base 12a. In the alternative position shown in FIG. 2, cylinder-piston unit 20, 21 has been actuated to shift support member 18 to the right relative to second frame 11 and conveying bar 12, so that openings 17 are now offset to the right with respect to the associated pivot bearings 14. This results in the coiled springs 15 as well as the pawls 13 now being inclined in the opposite direction. FIG. 4 shows an enlarged detail view of a pawl 13 in the position of FIG. 1, together with the conveying bar 12 and the position of the associated coil spring 15 and support member 18.

The described drive unit operates as follows: A carrier unit 3 is advanced along track section 1 and rail portions 1a and 1b to a position adjacent pawls 13. If the carrier unit has sufficient momentum, it will now be able to pass the pawls from right to left in FIG. 1 by raising the depending arms of the pawls against the bias of the associated coiled springs 15. If however the carrier unit comes to a halt adjacent pawls 13, it has to be conveyed further by actuation of cylinder-piston unit 7. Actuation of unit 7 causes piston rod 7a together with bracket 8, sliding shoe 9 and second frame 11 to reciprocate in the direction of double arrow A. This movement of frame 11 is transmitted to conveying bar 12 and, via inoperative cylinder-piston unit 20, 21, also to support member 18, so that the latter oscillates in synchronism with conveying bar 12. This results in the position of openings 17 relative to pivot bearings 14 and thus the position of coiled springs 15 and pawls 13 relative to conveying bar 12 remaining unchanged. In the normal position shown in FIG. 1, the conveying direction and thus the direction of the working stroke of the conveying bar is from right to left. During each working stroke the abutment edge 13a of a pawl 13 engages the carrier unit 3 and advances it towards the left. During the return stroke, the next pawl 13 to the left is cammed upwards by the carrier unit, so that the latter can pass therebelow. This is the same relative movement as in the above described case of the carrier unit passing the pawls due to its momentum. If the cylinder-piston unit 20, 21 is actuated to shift support member 18 to the position shown in FIG. 2, the pawls are inclined in the opposite direction, so that the directions of the working and return strokes are reversed. In this position, reciprocation of the conveying bar 12 causes carrier units 3 to be conveyed in the direction of arrow C, i.e. towards the right. Due to the engagement of their inoperative arms with the base 12a of conveying bar 12 in the positions shown in FIGS. 1 and 2, the pawls 13 can only be pivoted in one direction, i.e. clockwise in FIG. 1 and anticlockwise in FIG. 2. Accordingly they prevent movement of the carrier units 3 opposite to the intended conveying direction.

The lefthand end portion of the conveying bar 12 shown in FIGS. 1 and 2 carries three pawls 13′ having only one arm, namely, the one to the right in the drawing. As evident from FIG. 1, these pawls 13′ are operative to convey only in one direction, namely, towards the right as indicated by arrow C. In the case of the working stroke being directed towards the left they remain inoperative. From this follows that a carrier unit 3 in the position shown in FIG. 1 will be conveyed further only during one final working stroke by engagement with the last two-armed pawl 13 to the left. If this carrier unit 3 is followed by further carrier units, irrespective of whether coupled therewith or not, it will then be pushed beyond the one-armed pawls 13′ onto track section 1. The last conveyed carrier unit comes to a halt adjacent the one-armed pawls 13′ without a braking device being required to this effect. If the lefthand track section 1 belongs to a dead-end section serving for instance as an intermediate or final storage section, the carrier units stored thereon can be retrieved by simply shifting the drive unit 2 to the position shown in FIG. 2. As soon as the conveying bar 12 is then reciprocated by actuation of the cylinder-piston unit 7, the one-armed pawls 13′ will engage the carrier unit or units within their reach and convey it or them as well as any following units in the direction of arrow c towards the righthand track section 1.

As seen in FIG. 3, a carrier unit 3 designed for cooperation with the described drive unit 2 is formed as a trolley having two rollers 23 mounted at right angles to one another on an integral stirrup 24 so as to be able to travel on track sections 1 and, as shown in FIG. 3, on rail portions 1b. The depending portion of stirrup 24 carries a transverse bracket 25 for engagement with the abutment edges 13a of pawls 13. At its lower end, stirrup 24 carries a ring 26 for suspending a load, for instance a coat hanger to be conveyed, therefrom. FIG. 3 further shows a cross-sectional view of the conveying bar 12 and the support member 18 as well as a coiled spring 15 extending through openings 16 and 17.

FIG. 5 shows a diagrammatical top plan view of a drive unit 2′ having two conveying bars 12′ extending along opposite sides of rail portions 1b so that the pawls of both bars 12' are able to engage a carrier unit. One of the two conveying bars 12' is adapted to be reciprocated in the above described manner by means of a cylinder-piston unit. Both conveying bars 12' are provided with a toothed rack 27 meshing with a common gear 28 located therebetween, so that the two bars are caused to move in opposite directions relative to one another. The pawls of both conveying bars 12' are adjusted in such a manner that their working stroke, i.e. the conveying direction will be the same. This results in a nearly continuous movement of the conveyed goods without interruption during the return stroke. FIG. 5 only illustrates the principle of this drive arrangement. Instead of being directly connected to the conveying bars, the toothed racks may also be attached to the frame or to the sliding shoes. The drive connection might also be accomplished by means of any other suitable reversing transmission in place of the rack and gear transmission shown.

FIG. 6 shows a diagrammatical top plan view of yet another drive unit 2" also comprising two parallel and in the longitudinal direction partially overlapping conveying bars 12" which are actuated, however, independently of each other while being adjusted to the same conveying direction. The lowermost conveying bar 12" in FIG. 6, i.e. the righthand bar in the conveying direction B, receives the conveyed carrier units from lefthand bar 12" and conveys them further to the right. If an undesired pileup occurs in the downstream track section, the resulting upstream pileup of the consecutively conveyed carrier units causes compression of a compression spring 29. The compression of spring 29 is increased during each working stroke of the conveing bars, until it is sufficient to push the piled-up carrier units over the location of the pileup. This drive unit is therefore intended for installation at a location whereat a pileup is likely to occur, for instance adjacent narrow bends etc.

FIG. 7 shows a diagrammatic top plan view of two track sections 1c and 1d of a conveyor apparatus intended for use as intermediate or final storage areas and connected to a main track section 1 via switches 30 (not shown in detail). Track section 1c is provided with a drive unit 2 immediately adjacent switches 30 and carries a group of interconnected carrier units 3 carrying a coat hanger 4 each. Track section 1c ends at a relatively short distance beyond drive unit 2. The group of carrier units 3 has been conveyed along track section 1c in the direction of arrow B, and has come to a halt in a position in which the trailing carrier unit of the group remains within the reach of the one-armed pawls 13' retained in the inoperative position as already described. If the group of carrier units is to be retrieved from track section 1c, i.e. to be conveyed in the opposite direction indicated by arrow C, support member 18 is adjusted to bring the one-armed pawls 13' to their operative position, so that the group is conveyed towards main track section 1 via one or the other of the switches 30.

Track section 1d is of greater length than track section 1c. Both track sections are overhead sections mounted at a considerable height making manual conveying impracticable. For this reason, track section 1d is provided with a second drive unit 2 located at a distance a from drive unit 2 immediately adjacent switch 30. The distance a is selected such that the leading carrier unit of a standard-length carrier unit group arrives at the second drive unit 2 and is conveyed further thereby, while the trailing carrier unit is still within the reach of the first drive unit. Depending on the intended use of this track section, the drive unit 2 adjacent switch 30 may or may not be provided with one-armed pawls. If track section 1d is to be employed for storing carrier unit groups of the same length as those to be stored on track section 1c, the first drive unit is preferably provided with one-armed pawls. If in this case further carrier unit groups are to be stored, a preceding group will be pushed by the following group towards the second drive unit, which then takes over the further conveyance thereof.

From the above explanations it is evident that the invention is not restricted to the embodiments shown. Depending on the overall lay-out of the conveying apparatus, the configuration of the carrier units and the amount of goods to be conveyed at any given time, it is possible to employ any number of drive units according to the invention in various embodiments thereof. It is further possible within the scope of the invention to vary the shape of the pawls, the arrangement of their pivot bearings and stop means as well as their adjustability.

Within the scope of the invention, the drive unit may also be provided with drive transmitting members, such as pawls, engaging the carrier units sideways, or the drive unit may be located at a corresponding position relative to the conveyor tracks.

I claim:

1. A conveyor apparatus particularly for intra-plant conveyance in the garment industry, comprising conveyor tracks, carrier units travelling on said conveyor tracks and having each at least one stirrup member straddling a conveyor track from below and provided with rollers resting on the top surface of said track, and at least one drive unit for actively conveying said carrier units, characterized in that said drive unit (2) comprises a conveying bar (12) actuatable to reciprocate along a track section (1a) and carrying a plurality of drive transmitting members (13) for engagement with said carrier units (3), said drive transmitting members being operative when moving in one working stroke direction to convey said carrier units while being able to pass said carrier units without engagement therewith when moving in the return stroke direction, said track section (1c, 1a) being adapted to receive said carrier units (3) from only one end thereof and said conveying bar (12) being provided with one or more one-armed pawls (13') at the end portion of the conveying bar facing towards the said one end of said track section, the one arm of said one-armed pawls being located at the end of the pawls facing away from said one track section end.

2. A conveyor apparatus particularly for intra-plant conveyance in the garment industry, comprising conveyor tracks, carrier units travelling on said conveyor tracks and having each at least one stirrup member straddling a conveyor track from below and provided with rollers resting on the top surface of said track, and at least one drive unit for actively conveying said carrier units, characterized in that said drive unit (2) comprises conveying bar means actuatable to reciprocate along a track section (1a) and carrying a plurality of drive transmitting members (13) for engagement with said carrier units (3), said drive transmitting members being operative when moving in one working stroke direction to convey said carrier units while being able to pass said carrier units without engagement therewith when moving in the return stroke direction, said conveying bar means being at a position whereat a pile-up is likely to occur and including two partially overlapping conveying bars (12″) and a compression spring (29) associated with the downstream conveying bar and arranged so as to be compressible in a direction opposite to the conveying direction.

3. Conveyor apparatus comprising a conveying bar (12) operable to reciprocate along a track section (1a) and carrying a plurality of drive transmitting members (13) for engagement with carrier units (3), a support member (18) above said conveying bar, said drive transmitting members (13) being mounted on said conveying bar so as to convey in a working stroke direction and to pass said carrier units (3) without engagement therewith during the return stroke, characterized in that each drive transmitting member comprises a two-armed pawl (13) pivotally mounted at its center on a pivot mounting (14) and engaged by a coil spring (15) aligned perpendicularly to the main longitudinal direction of said pawl as well as to the axis of said pivot mounting (14), the free end of said spring being retained in said support member (18) which is spaced from said pivot mounting (14) and adapted to move parallel to the stroke direction together with said pivot mounting, said support member being formed as a rail having a bore (17) for each coil spring (15), the end portion of each coil spring (15) extending through the associated bore (17).

4. Conveyor apparatus according to claim 3, characterized in that said conveying bar (12) is formed as a U-section rail, the pivot mountings (14) of said pawls (13) being located between the two legs (12b) of said U-section, while the base (12a) thereof is provided with a recess (16) above each pivot mounting (14) for receiving the respective coil spring (15).

5. Conveyor apparatus according to claim 4, characterized in that the base (12a) forms a stop limiting the pivot movement of said pawls (13).

6. Conveyor apparatus according to claim 3, characterized in that said support member (18) is spring-biased into one end position and adapted to be moved to the other end position and to be retained therein by means of a cylinder-piston unit (20,21).

* * * * *